UNITED STATES PATENT OFFICE.

ADELE SCHMELZER KRUEGER, OF HANNAHFIELD, LENZIE, NEAR GLASGOW, SCOTLAND.

PREPARATION FOR BEVERAGES.

SPECIFICATION forming part of Letters Patent No. 483,067, dated September 20, 1892.

Application filed October 28, 1891. Serial No. 410,125. (No specimens.) Patented in England March 24, 1886, No. 4,114.

*To all whom it may concern:*

Be it known that I, ADELE SCHMELZER KRUEGER, a subject of the Queen of Great Britain, formerly residing at Hannahfield, Lenzie, near Glasgow, at present residing at 89 Grant Street, Glasgow, in the county of Lanark, North Britain, have invented a new and useful Preparation for a Medicinal Beverage, (for which I have obtained a patent in Great Britain, No. 4,114, dated March 24, 1886,) of which the following is a specification.

My invention consists in the new preparation hereinafter described and claimed. The preparation is formed of celery or celeriac, (turnip-rooted celery,) which is treated as follows: The celery is cut into convenient lengths or pieces and then dried in the sun or otherwise. After becoming thoroughly dry the celery is roasted in any convenient way, after which it is ground and put up in suitable packages.

The preparation is used as follows: A suitable quantity (about a table-spoonful to a cup of water) is boiled in water and may be freely partaken of either with or without the addition of cream and sugar. It will be found that the medicinal beverage thus formed will be wholly free from the taste and smell of celery, as the process of treating the latter has wholly changed the character of the odor and taste thereof. Thus the natural appearance and character of the vegetable as regards taste and odor have changed, and a different odor and taste are imparted thereto; but the medicinal properties remain.

I have found the use of the preparation highly beneficial in the treatment of rheumatism and nervous disorders, and it is also an anti-scorbutic.

I would have it distinctly understood that the preparation is not intended as a food adulterant, and, in fact, its cost (about one dollar per pound) would effectually prevent this, and it will require care to see that my preparation itself is not adulterated with some less-expensive material.

Having thus described my invention, what I claim as new, and desire to secure by Letters Patent, is—

1. As a new article of manufacture, the herein-described medicinal preparation, consisting in celery or celeriac dried, roasted, and reduced, substantially as set forth.

2. As a new article, the herein-described medicinal powder, consisting in celery or celeriac dried, roasted, and ground, substantially as set forth.

ADELE SCHMELZER KRUEGER.

Witnesses:
   WILLIAM SHAW,
   PETER H. WADDELL.